United States Patent [19]

Fujita et al.

[11] Patent Number: 4,781,976

[45] Date of Patent: Nov. 1, 1988

[54] SKIN COVERING FOR TRIMS OF AUTOMOBILES

[75] Inventors: Akihito Fujita; Tamotu Nagao, both of Takatsuki; Chikaaki Okamura, Uji; Fumihiko Yoshida, Ibaraki, all of Japan

[73] Assignee: Sunstar Giken Kabushiki Kaisha, Takatsuki, Japan

[21] Appl. No.: 127,041

[22] Filed: Nov. 27, 1987

[30] Foreign Application Priority Data

Nov. 28, 1986 [JP] Japan .................................. 61-285573

[51] Int. Cl.$^4$ ................................................. B32B 3/26
[52] U.S. Cl. .................................. 428/318.6; 428/319.7
[58] Field of Search ............... 428/314.4, 314.8, 316.6, 428/318.6, 319.7

[56] References Cited

U.S. PATENT DOCUMENTS 4,504,536  3/1985  Wong ................................ 428/316.6
4,510,201  4/1985  Takeuchi et al. ................. 428/318.6

FOREIGN PATENT DOCUMENTS 45-36033  11/1970  Japan ................................ 428/318.6
57-66954   4/1982  Japan ................................ 428/318.6

Primary Examiner—William J. Van Balen
Attorney, Agent, or Firm—Wegner & Bretschneider

[57] ABSTRACT

A skin covering for trims of automobiles having three layer structure comprising (a) a surface layer comrising a PVC having a mean degree of polymerization ($\bar{P}$) of 2,000 or more (high polymerization PVC), (b) a foam layer comprising a blend of a crosslinking PVC and a PVC having a $\bar{P}$ of less than 1,500 (low polymerization PVC) and a foaming agent, and (c) a back layer comprising a low polymerization PVC, said skin covering having excellent processability with the cloth by high frequency welding and excellent vacuum forming properties and being useful for the facing of trims of automobiles.

7 Claims, 1 Drawing Sheet

SKIN COVERING FOR TRIMS OF AUTOMOBILES

This invention relates to a skin covering for trims of automobiles, more particularly, to a skin covering having three layer structure which is used together with a cloth for facing the trims of automobiles, said skin covering being applied to by vacuum forming and having excellent processability with the cloth by high frequency welding and excellent vacuum forming properties.

TECHNICAL BACKGROUND AND PRIOR ART

The trims of automobiles are usually subjected to facing processing, for example, by applying a prescribed size of a cloth (e.g. moquette fabrics, tricot fabrics, etc.) to the surface thereof, applying a skin covering to whole surface including the region applied with a cloth by vacuum forming, treating the periphery of the overlapped region of the cloth and the skin covering by high frequency welding, and then removing a part (surplus) of the skin covering to expose the cloth. As the skin covering, there is usually used a polyvinyl chloride sheet, which is melt-adhered with the cloth by high frequency welding, but this skin covering has insufficient strength and adhesion. In order to improve the adhesion, it has been proposed to use a low polymerization polyvinyl chloride. The low polymerization polyvinyl chloride is effective for improving the melt adhesion, but it results in defect (breaking of the covering, etc.) in the vacuum forming processing.

OBJECT OF THE INVENTION

The present inventors have studied to find an improved skin covering having both excellent processability by high frequency welding and excellent vacuum forming properties, and have found that the desired skin covering can be obtained by using a specific polyvinyl chloride and forming in three layer structure, i.e. a surface layer, a foam layer and a back layer wherein the polyvinyl chloride (abbreviated as "PVC") in each layer has specific kind and degree of polymerization.

An object of the invention is to provide a skin covering for trims of automobiles having excellent processability by high frequency welding and excellent vacuum forming properties. Another object of the invention is to provide a skin covering for trims of automobiles having specific three layer structure made of a specific polyvinyl chloride. These and other objects and advantages of the invention will be apparent to those skilled in the art from the following description.

BRIEF DESCRIPTION OF DRAWING

The accompanying

DETAILED DESCRIPTION OF THE INVENTION

Figure 1:
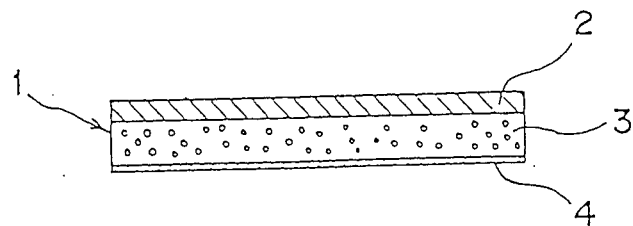
FIG. 1 shows a sectional view of one embodiment of a skin covering of this invention.

The skin covering for trims of automobiles of this invention comprises (a) a surface layer comprising a PVC having a mean degree of polymerization ($\bar{P}$) of 2,000 or more (hereinafter, referred to as "high polymerization PVC"), (b) a foam layer comprising a blend of a crosslinking PVC and a PVC having a $\bar{P}$ of less than 1,500 (hereinafter, referred to as "low polymerization PVC") and a foaming agent, and (c) a back layer comprising a low polymerization PVC.

For the surface layer (a), there is used a high polymerization PVC having a $\bar{P}$ of 2,000 or more, preferably 2,500 to 4,000. By using such a high polymerization PVC, there can be prevented or inhibited undesirable drawing down of the layer in the vacuum forming step, and further, there can be prevented undesirable rapid softening of the formed layer in the high frequency welding step. The high polymerization PVC is preferably blended with a conventional PVC for cars or other vehicles which has a grade of $\bar{P}$ of 1,500 to less than 2,000 (hereinafter, it is referred to as "medium polymerization PVC") in the blend ratio of 50/50 to 90/10 by weight (high polymerization PVC/medium polymerization PVC). By blending the high polymerization PVC with the medium polymerization PVC, the layer is given by elongation properties which are necessary in the vacuum forming step and further given by improved setting properties which are necessary in the high frequency welding step.

The surface layer is formed in the manner as described hereinafter by using a composition comprising the high polymerization PVC (preferably in combination with a medium polymerization PVC) and conventional other additives such as plasticizers, stabilizers, catalysts, fillers, pigments, and the like. For instance, the composition is a plastisol comprising a high polymerization PVC (and optionally a medium polymerization PVC); a conventional plasticizer, such as phthalic acid esters (e.g. dioctyl phthalate (abbreviated as "DOC"), diisodecyl phthalate (abbreviated as "DIDP"), dibutyl phthalate (abbreviated as "DBP"), diundecyl phthalate (abbreviated as "DUP"), butyl benzyl phthalate, etc.), glycol esters (e.g. diethylene glycol dibenzoate, pentaerythritol ester, etc.), fatty acid esters (e.g. butyl oleate, methyl acetylricinoleate, etc.), phosphates (e.g. tricresyl phosphate, trioctyl phosphate, octyl diphenyl phosphate, etc.), chlorinated paraffins, and the like, said plasticizers being usually used in an amount of 5 to 80 parts by weight per 100 parts by weight of PVC; a stabilizer or catalyst (e.g. dibutyl tin dilaurate, dibutyl tin dimaleate, dibutyl tin phthalate, stannous laurate, epoxylated soybean oil, Ba-Zn stabilizers, etc.); a filler (e.g. calcium carbonate, carbon black, bentonite, titanium oxide, ferric oxide, talc, etc.); a pigment; and the like. (The plastisol is hereinafter referred to as "plastisol A").

For the foam layer (b), there is used a blend of a crosslinking PVC and a low polymerization PVC in a ratio of crosslinking PVC/low polymerization PVC in the range of 20/80 to 90/10 by weight, preferably 30/70 to 80/20 by weight. The crosslinking PVC is effective for preventing occurrence of insufficient foaming or uneven foaming in the vacuum forming step, and the low polymerization PVC is effective for promoting suitable softening of the layer in the high frequency welding step.

The crosslinking PVC includes a PVC having at least two crosslinkable groups (e.g. hydroxy, carboxy, or amino group) in the molecule, for example, a copolymer of acrylic monomer containing crosslinking groups (e.g. 2-hydroxyethyl methacrylate, etc.) and vinyl chloride.

The low polymerization PVC has a $\bar{P}$ of less than 1,500, preferably 800 to less than 1,500.

The foam layer is formed in the manner as described hereinafter by using a composition comprising a blend of a crosslinking PVC and a low polymerization PVC and conventional additives, such as foaming agents, foaming auxiliary, plasticizers, stabilizers or catalysts, fillers, pigments, and the like. For instance, the composition is a plastisol comprising a blend of a crosslinking PVC and a low polymerization PVC, a foaming agent (e.g. azodicarboxamide, dinitrosopentamethylene tetramine, diethyl azodicarboxylate, azobisisobutyronitrile, etc.), a foaming auxiliary (e.g. urea auxiliary, organic acid auxiliary, metal salt auxiliary), a plasticizer, a stabilizer or catalyst, a filler, a pigment, and the like. (Hereinafter, this plastisol is referred to as "plastisol B") The foaming agent is used in such an amount that the expanded ratio becomes 2- to 8-fold, preferably 4- to 6-fold.

The back layer (c) in this invention functions as an adhesive layer between the skin covering and the trims or cloth in the high frequency welding step, and the low polymerization PVC is used particularly for the purpose of easily adhering the skin covering with the trims or cloth by the high frequency welding without using any specific adhesive or hot melt sheet. The low polymerization PVC is preferably the same PVC as or similar to the low polymerization PVC used for the foam layer (b), by which the back layer is more highly adhered to the foam layer and undesirable peeling between the layers can be prevented. The back layer (c) can be formed by using a plastisol comprising a low polymerization PVC, plasticizers, other stabilizers or catalysts, fillers, and the like. (Hereinafter, the plastisol is referred to as "plastisol C")

Referring to the accompanying figures, the preparation of the skin covering for trims of automobiles of this invention and the utilities thereof are illustrated below.

As is shown in FIG. 1, the skin covering 1 of this invention comprises a laminate of a surface layer 2, a foam layer 3 and a back layer 4. The skin covering is usually prepared by applying a plastisol C onto a releasing paper and gelling it, and subsequently, laminating thereon plastisol B and plastisol A by applying and gelling them likewise in this order. The gelation of each layer is usually carried out by heating at 180°–250° C. for 20–40 seconds. After lamination, the three-layered laminate is heat-treated at 180°–230° C. for 1–3 minutes, by which the plastisol B is molten and foamed. After cooling, the releasing paper is peeled off to give the skin covering 1 consisting of the surface layer 2 having a thickness of 0.2–1 mm (preferably 0.35–0.60 mm), the foam layer 3 having a prescribed expanded ratio and the back layer 4 having a thickness of 0.05–0.5 mm (preferably 0.07–0.20 mm). Alternatively, each layer having a prescribed thickness is separately prepared from plastisols A to C by conventional calendering or extrusion technique, and these layers are laminated by heat adhesion or with an adhesive, and then, the resultant is subjected to embossing to give the desired skin covering.

Figure 2:
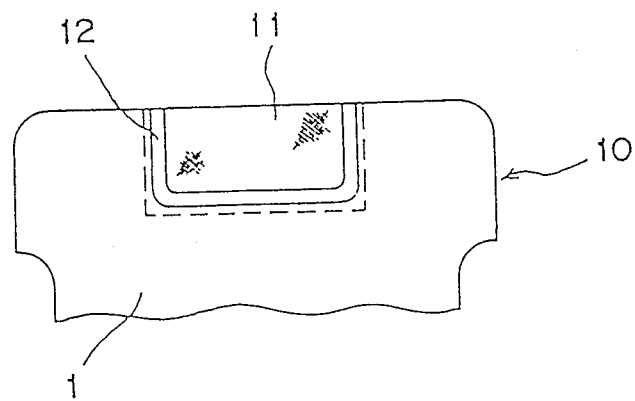
FIG. 2 shows a plane view of a part of one embodiment of a trim of automobile applied with a skin covering of this invention.

The skin covering of this invention is useful for facing of trims of automobiles together with a cloth. For example, it is used for the preparation of a trim of an automobile as shown in the partial plane view of FIG. 2 in the following manner. Firstly, a cloth 11 having a prescribed size is applied onto the surface of a base (e.g. hardboard, etc.) for trim 10 with an adhesive, and the skin covering 1 of this invention is wholly applied thereon by vacuum forming so as to cover the cloth 11. The vacuum forming is carried out at a temperature of heater of 200°–500° C, a surface temperature of the skin of 130°–160° C., a temperature of the back layer of 120°–150° C., and a vacuum pressure of 600 mmHg or more. Subsequently, the periphery 12 of the ovelapped region of the cloth 11 and the skin covering 1 is subjected to a high frequency welding (under the conditions of an electric current: 0.4–0.8 A, for 5–10 seconds, cooling for 10–20 seconds). Unnecessary part of the skin covering 1 (i.e. the inner region of the periphery 12) is removed to expose the surface of the cloth 11, by which the desired trim 10 is prepared.

In the preparation of a trim, the skin covering of this invention can exhibit excellent effects due to the three layer structure, that is, the skin covering can strongly be adhered with the cloth in the high frequency welding step and further no breaking of the covering is observed even in the vacuum forming step.

This invention is illustrated by the following Examples but should not be construed to be limited thereto.

EXAMPLE 1

Plastisols A–C having the following compositions are prepared by mixing the components.

| Plastisol A | |
|---|---|
| Components | Part by weight |
| A high polymerization PVC (Vinica P470, manufactured by Mitsubishi Monsanto Chemical Co., $\bar{P}$ = 3,500) | 50 |
| A medium polymerization PVC (PSH 20, manufactured by Kanegafuchi Chemical Industry Co., Ltd., $\bar{P}$ = 1,700) | 50 |
| DUP (manufactured by Shinnippon Rika K. K.) | 60 |
| Stabilizer (Ba—Zn stabilizer/epoxy stabilizer) | 6 |
| Pigment | 8 |

| Plastisol B | |
|---|---|
| Components | Part by weight |
| A crosslinking PVC (P100, manufactured by Mitsubishi Monsanto Chemical Co.) | 50 |
| A low polymerization PVC (PSL 37A, manufactured by Kanegafuchi Chemical Industry Co., Ltd., $\bar{P}$ = 850) | 50 |
| DUP | 60 |
| Stabilizer | 6 |
| Foaming agent (azodicarbonamide) | 4 |
| Foaming auxiliary | 2 |
| Pigment | 1 |

| Plastisol C | |
|---|---|
| Components | Part by weight |
| A low polymerization PVC (PSL 37A) | 100 |
| DUP | 60 |
| Stabilizer | 6 |

Firstly, the above plastisol C is applied onto a releasing paper and then gelled by drying at 200° C. for 30 seconds, and thereon, the plastisols B and A are applied and gelled by drying likewise. Thereafter, the resultant is heat-treated at 200°–220° C. for 2 minutes, by which the plastisol B is foamed. After cooling, the releasing paper is released to give a skin covering having a surface layer having a thickness of 0.5 mm, a foam layer having an expanded ratio of 4-fold and a back layer having a thickness of 0.1 mm.

What is claimed is:

1. A skin covering for trims of automobiles which comprises
   (a) a surface layer comprising a high polymerization polyvinyl chloride having a mean degree of polymerization of 2,000 or more,
   (b) a foam layer comprising a blend of a crosslinking polyvinyl chloride and a low polymerization polyvinyl chloride having a mean degree of polymerization of less than 1,500 and a foaming agent, and
   (c) a back layer comprising a low polymerization polyvinyl chloride having a mean degree of polymerization of less than 1,500.

2. The skin covering according to claim 1, wherein the high polymerization polyvinyl chloride has a mean degree of polymerization of 2,500 to 4,000.

3. The skin covering according to claim 1, wherein the low polymerization polyvinyl chloride has a mean degree of polymerization of 800 to less than 1,500.

4. the skin covering according to claim 1, wherein the blend of a crosslinking polyvinyl chloride and a low polymerization polyvinyl chloride in the foam layer has a blend ratio of crosslinking polyvinyl chloride/low polymerization polyvinyl chloride of 20/80 to 90/10 by weight.

5. The skin covering according to claim 1, wherein the surface layer (a) comprises a blend of a high polymerization polyvinyl chloride having a mean degree of polymerization of 2,000 or more with a medium polymerization polyvinyl chloride having a mean degree of polymerization of 1,500 to less than 2,000.

6. The skin covering according to claim 5, wherein the blend of a high polymerization polyvinyl chloride and a medium polymerization polyvinyl chloride has a blend ratio of high polymerization polyvinyl chloride/medium polymerization polyvinyl chloride of 50/50 to 90/10 by weight.

7. The skin covering according to claim 1, wherein the surface layer (a) has a thickness of 0.2–1 mm, the foam layer (b) has an expanded ratio of 2- to 8-fold, and the back layer (c) has a thickness of 0.05–0.5 mm.

* * * * *